(12) United States Patent
Peduto et al.

(10) Patent No.: US 6,696,826 B2
(45) Date of Patent: Feb. 24, 2004

(54) SWITCHING MODE DRIVING OF AN INDUCTIVE LOAD

(75) Inventors: Vittorio Peduto, Ivrea (IT); Simone Gardella, Vimodrone (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 192 days.

(21) Appl. No.: 10/054,679

(22) Filed: Jan. 22, 2002

(65) Prior Publication Data

US 2002/0113582 A1 Aug. 22, 2002

(30) Foreign Application Priority Data

Jan. 23, 2001 (IT) ..................... VA2001A0002

(51) Int. Cl.$^7$ ................................................ G05F 1/40
(52) U.S. Cl. ............................................. 323/284; 363/98
(58) Field of Search ............................ 323/222, 282, 323/283, 284, 285, 237; 363/98, 132

(56) References Cited

U.S. PATENT DOCUMENTS 4,736,267 A * 4/1988 Karlmann et al. ...... 323/285 X
6,396,251 B2 * 5/2002 Corva et al. ............. 323/283

* cited by examiner

*Primary Examiner*—Jessica Han
(74) *Attorney, Agent, or Firm*—Allen, Dyer, Doppelt, Milbrath & Gilchrist, P.A.; Lisa K. Jorgenson

(57) ABSTRACT

A method of driving an inductive load connected to an output of a power stage includes comparing a signal representative of an instantaneous value of current flowing through the inductive load with upper and lower thresholds during a switching cycle. The method also includes alternately performing a magnetization phase during which current is forced through the inductive load, and a demagnetization phase during which a load inductance of the inductive load discharges through at least one of a slow recirculation discharge current path and a fast recirculation discharge current path. Switching is performed between the slow and fast recirculation discharge current paths during each switching cycle as a function of the comparison for reducing a ripple on an output signal from the power stage.

26 Claims, 6 Drawing Sheets

SWITCHING MODE DRIVING OF AN INDUCTIVE LOAD

FIELD OF THE INVENTION

The present invention relates in general to switching mode driving techniques of an inductive load, and in particular, to the control of the current circulating in the inductive load.

BACKGROUND OF THE INVENTION

There is an increasing use of digital systems not only for driving motors or electromagnetic actuators, but also for analog signal processing applications, such as, for example, in an audio amplifier for reducing power consumption. This implies the use of final driver stages for driving inductive loads, wherein the driver stages function in a switching mode, typically, but not exclusively, according to a pulse width modulation (PWM) technique and variations thereof. Driving an inductive load in such a mode brings about the presence of a certain ripple, which has a limited and tolerable amplitude, on the output waveforms. In these applications, it is necessary to precisely control the current circulating in the external inductive load. This is commonly implemented by a feedback loop that regulates the relative duration of alternating magnetization and demagnetization phases.

The ability of PWM driving circuits to track the dynamics (voltage swing) of an analog input signal even during abrupt amplitude changes, and the requirement of minimizing the residual ripple on the output waveform imposes contrasting electrical requirements on the discharge current path of the load inductance during the demagnetization phases that alternate to the magnetization phases at the base or mean switching frequency.

Independent of the type of application, the base switching frequency, which is fixed for a constant frequency mode, or the interval of frequencies between a minimum and maximum switching frequency according to the variable frequency mode are established above the audible band that extends up to about 20 KHz. This is done to avoid generation of perceivable disturbances. Considering that the losses in the final stage due to the switching of the power switches increase with the switching frequency, it is advantageous to design such a fixed switching frequency or fixed mean frequency value in a range that is commonly between 20 and 30 KHz.

It is also known to effect the demagnetization phase according to a first mode commonly known as slow (current) recirculation, or according to a second mode commonly known as fast (current) recirculation. In the first mode of discharging the load inductance, the inductive load is normally short circuited so that the current may quickly decay as a function of only the electrical constant of the load itself. In the second mode of discharge, the load is applied a voltage of an opposite sign of the voltage that was applied thereto during the preceding magnetization phase for speeding-up (forcing) the discharge of the inductance.

It is known that by determining an automatic selection of either the first or the second discharge mode, or a combination of the two, the residual ripple is reduced and at the same time the speed for closely tracking the analog signal is preserved. Typically, a current mode driving of the load is implemented by monitoring on a sensing resistor the current flowing through the load, and using the voltage drop on the current sensing resistor as a feedback control signal.

The control logic of the final power stage detects any eventual shift of the actual current value from the desired value, and intervenes to modify the driving for bringing back the value of the current to the desired level. Numerous techniques are known for optimizing the performance by asserting a choice between a slow recirculation demagnetization and a fast recirculation demagnetization, or a mix of the two modes, as a function of certain parameters that are monitored during operation.

U.S. Pat. No. 4,743,824 discloses a driving method according to which, within each switching period, a magnetization phase and a demagnetization phase are performed. The latter may be conducted according to a slow recirculation mode or a fast recirculation mode. The slow recirculation mode is selected when the reference current value at the beginning of the switching period exceeds the value that it had at the beginning of the preceding switching period.

In contrast, the fast recirculation mode is selected when the reference current value at the start of the switching period is less than the value it had at the start of the preceding switching period. This method has the drawback of not accounting for the real current flowing in the load, and in case the reference signal is periodic, may generate spurious spectral components of relatively low frequency.

The commercial device having code number 3955, of Allegro Microsystems Incorporated, performs within each switching period a magnetization and a demagnetization phase. The latter is composed of a first part or sub-phase during which a fast recirculation demagnetization takes place followed by a second part or sub-phase during which a slow recirculation demagnetization is carried out. The ratio between the duration of the two parts of the demagnetization phase is established by an analog signal provided at the input of the device.

The method implemented in the above noted commercial device has the drawback of not accounting for the actual current flowing in the load unless complex ancillary circuitry is specifically formed. This is represented by the fact that within every switching period for a demagnetization phase, the switching losses in the power switches are relatively high. This is because a sub-phase is carried out according to a fast recirculation mode.

U.S. Pat. No. 6,119,046 discloses a method according to which, within each switching period, a phase of magnetization and a phase of demagnetization are contemplated. The demagnetization phase is alternatively conducted according to a slow recirculation mode or according to a fast recirculation mode. It may also comprise a first part conducted according to a fast recirculation mode followed by a second part conducted according to a slow recirculation mode. The selection of the mode with which the demagnetization phase begins is made at the start of each switching period. This is done as a function of the difference between the reference value and the actual current value in the load. This method has the drawback of requiring that such a difference be the same and stored until the instant in which the demagnetization phase starts.

According to another method described in European Patent No. 613,235, each switching period may comprise only a magnetization phase, only a demagnetization phase, or a phase of magnetization and a phase of demagnetization. The phase of demagnetization may be conducted according to a slow recirculation mode or a fast recirculation mode. The duration of the magnetization and demagnetization, as well as the mode with which the demagnetization phase is eventually performed, are established at the start of each switching period. This is done as a function of the value of the reference current or, alternatively, of the value of the current flowing in the load and of the difference between the reference value and the value of the current flowing in the load. This method has the drawback of requiring that the mode of carrying out the eventual demagnetization phase, which, as said above, must be selected at the start of each switching period, be stored until the instant in which the demagnetization phase starts.

According to another method disclosed in U.S. Pat. No. 4,904,562, a magnetization phase may precede or follow only a demagnetization phase conducted according to a slow recirculation mode, and a demagnetization phase conducted according to a fast recirculation mode may precede or follow only a phase of demagnetization conducted according to a slow recirculation mode. This method permits the amplitude of the residual ripple to be reduced, but does not improve performance as far as the speed of response is concerned.

SUMMARY OF THE INVENTION

In view of the foregoing background, an object of the present invention is to provide a method for driving in a switching mode an inductive load that eliminates or overcomes the above noted drawbacks and limitations of the known techniques.

According to the method of the invention, two phases that are selected among a magnetization phase, a slow recirculation demagnetization phase and a fast recirculation demagnetization phase, are carried out during each switching period or cycle. The two phases to be carried out are chosen as a function of the instantaneous conditions of operation that are constantly monitored in either a continuous mode or a sampled mode.

In particular, selection between a slow recirculation demagnetization phase and a fast recirculation demagnetization phase during a whole switching cycle is a function of the result of the comparison of a signal representative of the instantaneous value of the current flowing in the load with a pair of upper and lower threshold values.

According to a first preferred embodiment of the invention, each switching period begins with a magnetization phase to which a fast recirculation demagnetization phase follows whenever the signal representative of the current in the load exceeds the upper comparison threshold. If the instantaneous value of this signal drops below the lower comparison threshold before the next switching cycle begins, a slow recirculation demagnetization phase is performed.

The driving modulation (for example, a PWM type) may be performed with either a switching period of a pre-established duration (that is, according to a constant frequency mode) or the duration of the period may be variable (that is, according to a variable frequency mode), for example, by maintaining constant the duration of the demagnetization phase within each switching period of variable duration.

According to another embodiment of the invention, which is particularly suited in a constant frequency modulation, the signal representative of the current flowing in the load is compared at the beginning of each new switching cycle with both thresholds. If the signal exceeds the upper threshold, a fast recirculation demagnetization phase is performed. If the signal exceeds the lower threshold but not the upper threshold, a slow recirculation demagnetization phase is performed. If the signal is below the lower threshold, a magnetization phase is performed. The selection of the phase that is made is retained until the start of the following switching cycle.

According to yet another embodiment of the invention, particularly suited in the case of a constant frequency modulation, the signal representative of the current flowing in the load is compared at the start of each cycle with both thresholds. Based upon the comparison, the following functions may be performed.

If the signal exceeds the upper threshold, a fast recirculation demagnetization phase is performed. If during such a demagnetization phase the signal drops below the lower threshold, a slow recirculation demagnetization phase is performed that lasts until the following switching period begins.

If the signal exceeds the lower threshold but not the upper threshold, a slow recirculation demagnetization phase is performed. If during such a phase the signal exceeds the upper threshold (because of an abrupt increase of the current), a fast recirculation demagnetization phase is performed that lasts until the following switching period begins.

If the signal is below the lower comparison threshold, a magnetization phase is performed. Preferably, though not necessarily, the upper threshold and the lower threshold may be established to be substantially symmetric with respect to the reference value that represents the desired current value through the load.

BRIEF DESCRIPTION OF THE DRAWINGS

The different features and advantages of the invention will become even more evident through the following detailed description and by referring to the attached drawings, wherein.

DETAILED DESCRIPTION OF THE PREFERRED EMBODIMENTS

Figure 1:
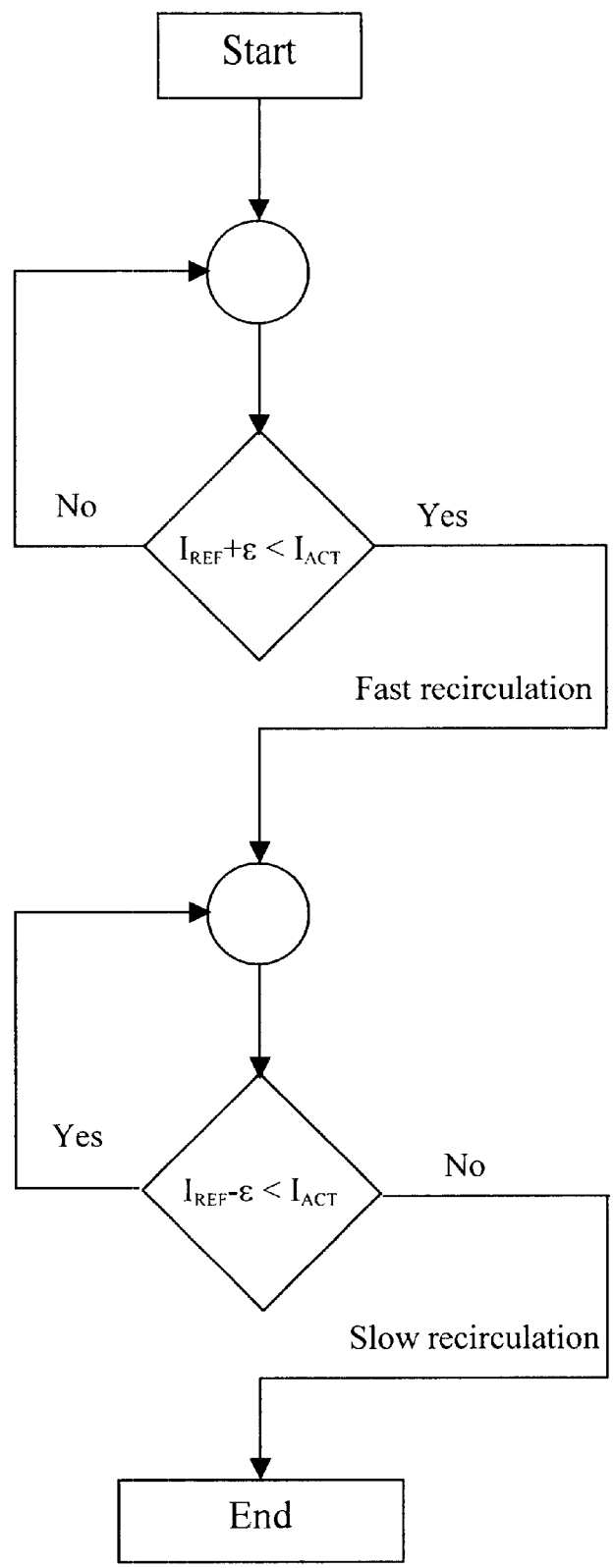
FIG. 1 is a flow chart of a first embodiment of the method according to the invention.

According to a first embodiment of the method of the invention illustrated in FIG. 1, at the start of each new switching period or cycle, a magnetization phase is performed which lasts until the current circulating in the load $I_{ACT}$ remains below the upper threshold $I_{REF}+_\epsilon$. When the upper threshold is exceeded, a phase of fast recirculation demagnetization begins. If before the end of the cycle the current drops below the lower threshold $I_{REF}-_\epsilon$, beginning from the instant in which the actual value of the current in the load crosses the lower threshold value, a slow recirculation demagnetization phase is carried out.

This method is effective both in case the load must be driven according to a constant frequency mode, or according to a constant time mode. The flow chart of FIG. 1 illustrates the above described method. At the beginning of each new switching cycle or period (START), a magnetization phase is performed.

A comparison between the current recirculating in the load and the upper threshold is carried out $I_{REF}+_\epsilon<I_{AT}$. If the current circulating in the load $I_{ACT}$ is lower than the upper threshold $I_{REF}+_\epsilon$, the phase of magnetization continues and the comparison is repeated. If that is not the case then a fast recirculation demagnetization phase is carried out.

Thereafter, a comparison is made between the current circulating in the load and the lower comparison threshold, $I_{REF}-_\epsilon<I_{ACT}$. If the current circulating in the load $I_{ACT}$ is greater than the load threshold value $I_{REF}-_\epsilon$, the demagnetization phase continues and the comparison is repeated. If that is not the case, then a slow recirculation demagnetization phase is carried out.

This sequence of phases interrupts itself when the switching period ends, regardless of the current state of the routine. When operating in a constant frequency mode, this occurs upon expiration of the fixed duration switching period. When operating in a variable frequency mode with a demagnetization phase of constant duration, this occurs upon expiration of the corresponding time interval of pre-fixed duration from the instant in which the current circulating in the load exceeds the upper threshold.

Figure 2:
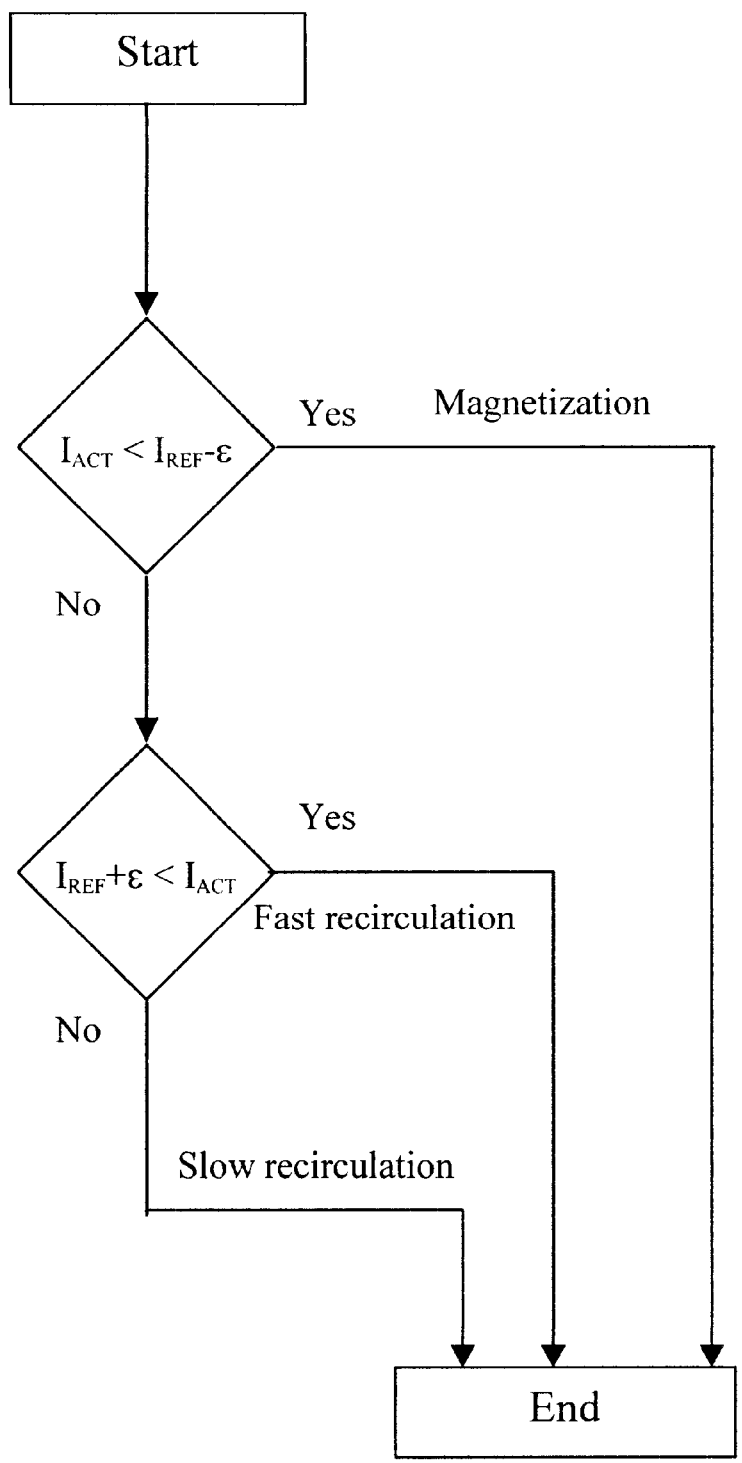
FIG. 2 is a flow chart of a second embodiment of the method according to the invention.

Another embodiment of the method of this invention, particularly suited in case the load must be driven according to a constant frequency mode, is depicted in FIG. 2. According to this embodiment, at the start of each new cycle of switching, the method includes simultaneously comparing the current circulating in the load $I_{ACT}$ with a lower threshold value $I_{REF}-\epsilon$ and with an upper threshold value $I_{REF}+\epsilon$, as depicted in the flow chart of FIG. 2.

If the signal exceeds the upper threshold, a fast recirculation demagnetization phase is carried out. If the signal exceeds the lower threshold but not the upper threshold, a slow recirculation demagnetization phase is performed instead. If the signal does not exceed the lower threshold, a magnetization phase is carried out instead. This algorithm continues to be implemented until the end of the switching period.

Figure 3:
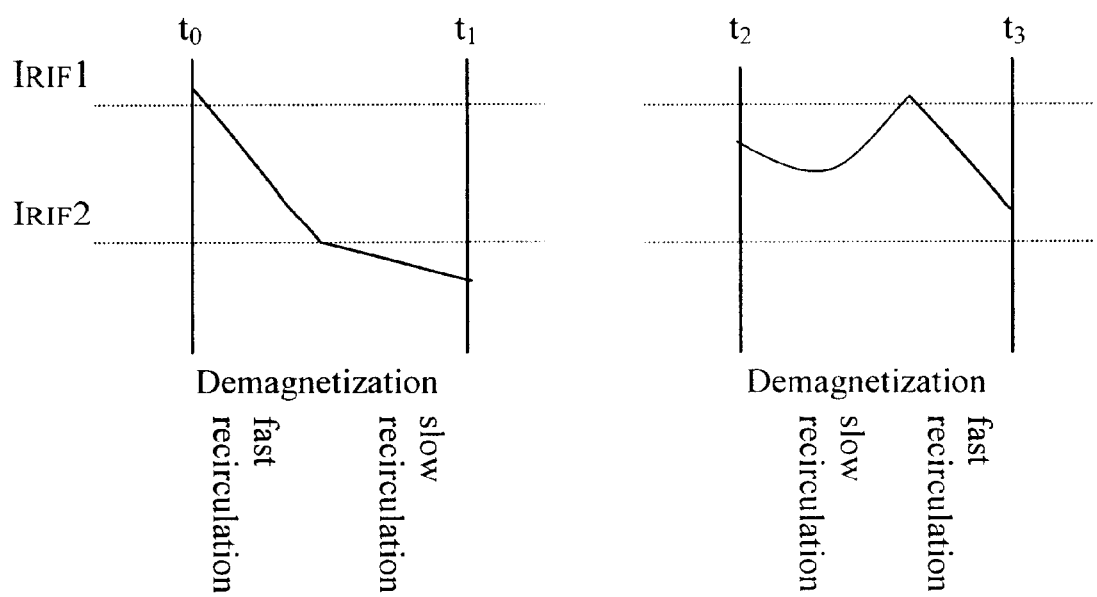
FIG. 3 is a timing diagram of the current flowing in the load for a third embodiment of the method according to the invention.

A particularly convenient variation of the above described method, forming a third embodiment of the method, may be introduced by selecting a slow recirculation discharge current path if during a fast recirculation demagnetization phase the lower threshold is crossed, or selecting a fast recirculation discharge current path if during a slow recirculation demagnetization phase the upper threshold is exceeded, as depicted in the timing diagrams of FIG. 3.

The latter situation may occur when driving electromechanical loads such as electrical motors, where back electromotive forces (BEMF) may be present. This is in view of the fact that in such a case there may be an increase in the circulating current during a slow recirculation demagnetization phase. With these arrangements, eventual current peaks are attenuated during a demagnetization phase, thus avoiding the current circulating in the load from excessively decreasing below a certain value. This is done while retaining the advantages, in terms of a fast dynamic response, that are intrinsic to the implementation of a fast recirculation demagnetization.

The upper threshold $I_{REF}+\epsilon$, and the lower threshold $I_{REF}-\epsilon$, with which the actual load current signal $I_{ACT}$ is compared, may be set to be symmetric with respect to a certain desired current value $I_{REF}$ as in the above described case, or they may be chosen to be asymmetric with respect to the desired current value or even follow different criteria. For example, the upper threshold value could be set to $I_{REF}$ and the lower threshold value could be set to $I_{REF}-\epsilon$, or the upper threshold could be set to $I_{REF}+\epsilon$ and the lower threshold could be set to $I_{REF}$.

In case the two threshold values are symmetric with respect to a reference current value, the value of $\epsilon$ may be chosen to correspond to a certain percentage of the reference value $I_{REF}$, or its value may be fixed differently. The value of $\epsilon$ may even be fixed to a constant value, independent of the value of $I_{REF}$, or it may be established through a special procedure which, upon periodic detecting of the condition of operation of the circuit, determines an optimized value of $\epsilon$ according to a certain algorithm.

Figure 4:
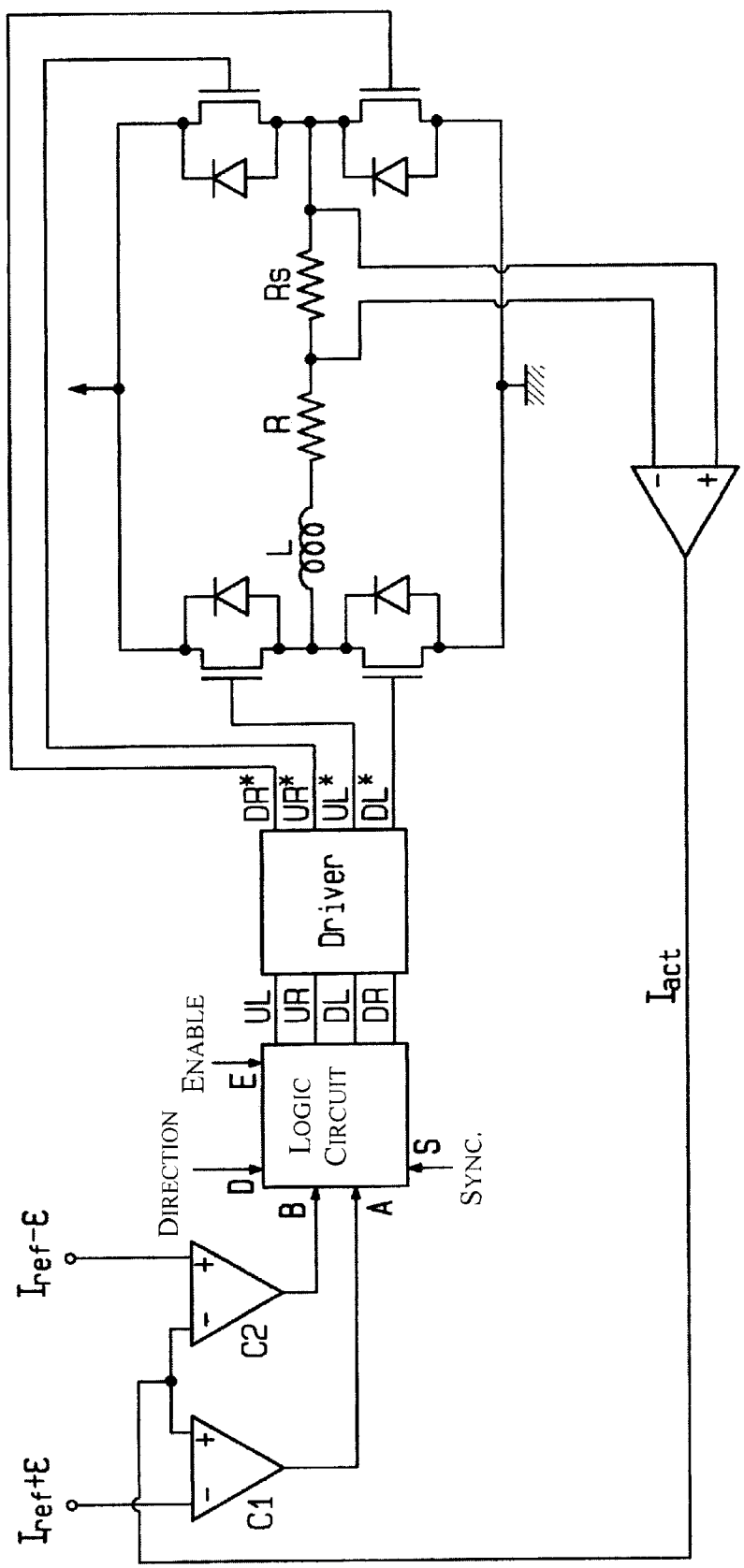
FIG. 4 is circuit for implementing the method according to the invention.

The method of this invention may be implemented straightforwardly even in hardware form, for example, by a circuit as the one shown in FIG. 4 as known by one skilled in the art. The two comparators C1 and C2 compare the value of the current that circulates in the inductive load, as sensed on the resistor $R_s$ with the upper threshold and the lower threshold for producing respective comparison signals A and B. These signals are processed by the logic circuit for producing the driving signals UL, UR, DL, DR for a full bridge power stage.

Figure 5A:
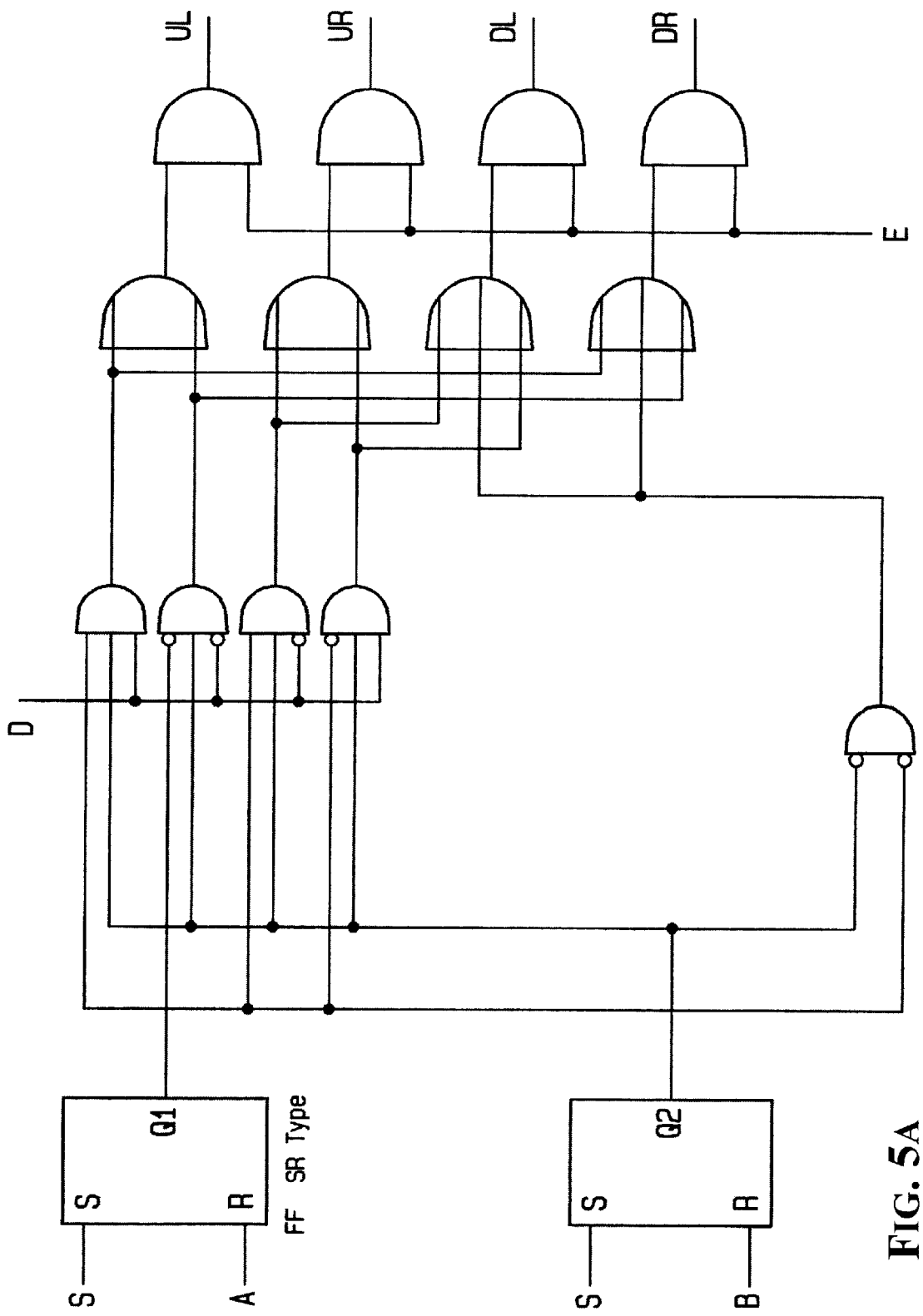
FIGS. 5a and 5b show alternative embodiments of the logic circuit illustrated in FIG. 4.
Figure 5B:
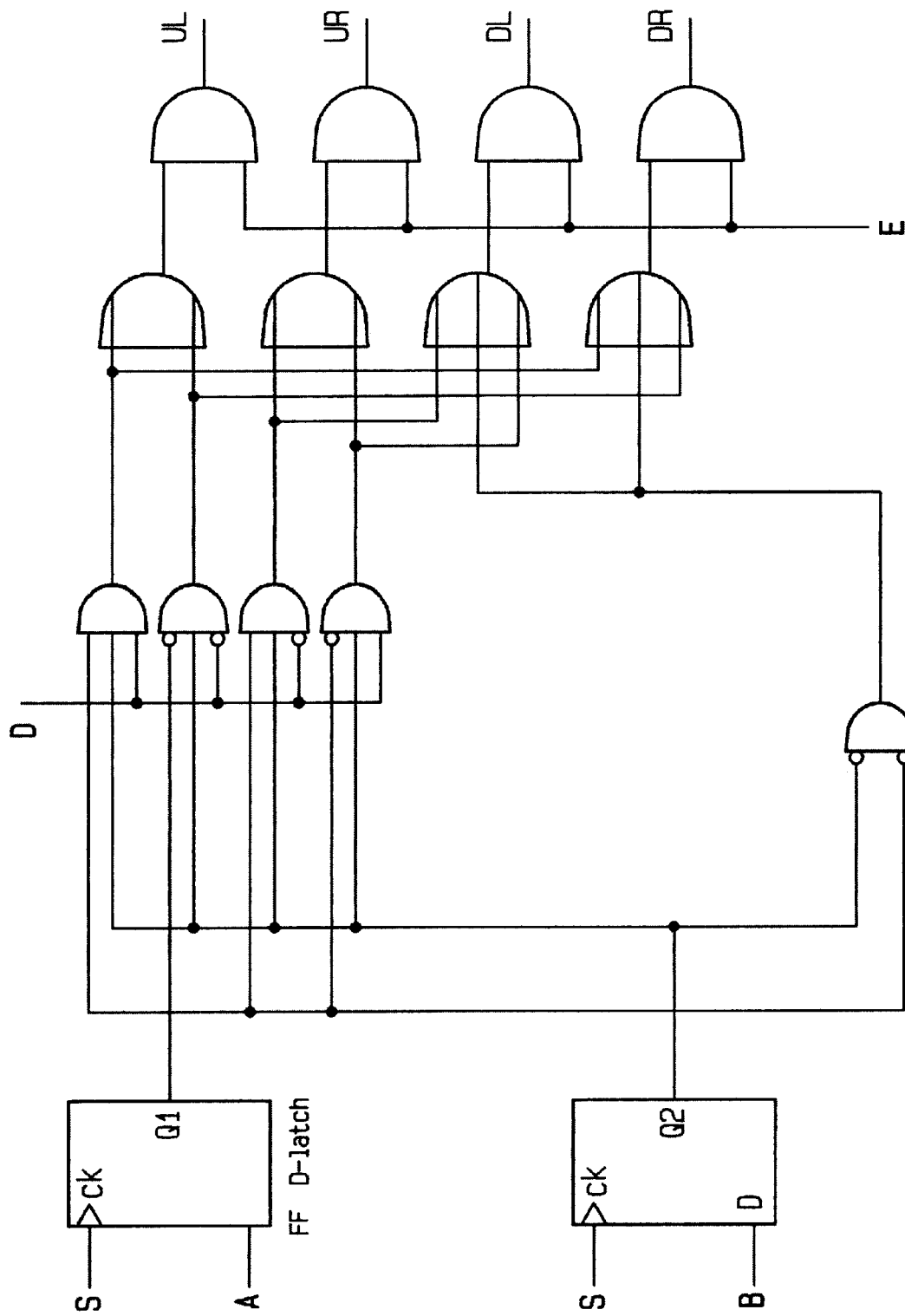

Sample embodiments of the logic circuits of FIG. 4, implementing the two preferred embodiments of the method of the invention, are depicted in FIGS. 5a and 5b in a symbolic manner that is immediately readable by one skilled in the art without the need of a reiterated detailed description of the functioning of the logic circuits that are used.

That which is claimed is:

1. A system for driving a load comprising:
    a final stage controlled by at least one driving signal, and being connected to the load;
    a driver stage connected to said final stage for providing the at least one driving signal;
    a logic circuit connected to said driver stage for controlling the at least one driving signal based upon respective error signals;
    a sensor connected to the inductive load for generating a signal representative of an instantaneous value of a current flowing through the load during a switching cycle; and
    first and second comparators having respective inputs for receiving the signal and for respectively comparing the signal to first and second thresholds, said first and second comparators having an output for providing the respective error signals to said logic circuit.

2. A system according to claim 1, wherein said final stage comprising at least four power switches controlled by respective driving signals.

3. A system according to claim 1, wherein said driver stage alternately performs a magnetization phase, and a demagnetization phase comprising a slow recirculation demagnetization mode and a fast recirculation demagnetization mode, and switches between the slow and fast recirculation demagnetization modes during each switching cycle as a function of the comparison.

4. A method according to claim 3, wherein alternately performing the magnetization and demagnetization phases comprises, at a start of each new switching cycle, performing the magnetization phase as long as the signal remains below the upper threshold or until the switching cycle ends, whichever occurs first.

5. A system according to claim 3, wherein switching between the slow and fast recirculation demagnetization modes is based upon the following conditions:
    if during the switching cycle the signal exceeds the upper threshold, then switching to the fast recirculation demagnetization mode as long as the signal exceeds the lower threshold or until the switching cycle ends, whichever occurs first; and
    if the signal drops below the lower threshold in the fast recirculation demagnetization mode, then switching to the slow recirculation demagnetization mode until the switching cycle ends.

6. A system according to claim 3, wherein the switching cycle is based upon a constant switching frequency; wherein said first and second comparators compare the signal at a start of each new switching cycle; and wherein said driver stage switches between the slow and fast recirculation demagnetization modes based upon the following conditions:
    if the signal exceeds the upper threshold, then switching to the fast recirculation demagnetization mode;
    if the signal exceeds the lower threshold but not the upper threshold, then switching to the slow recirculation demagnetization mode; and if the signal is less than the lower threshold, then performing the magnetization phase.

7. A system according to claim 3, wherein the switching cycle is based upon a constant switching frequency; wherein said first and second comparators compare the signal at a start of each new switching cycle; and wherein switching between the slow and fast recirculation demagnetization modes is based upon the following conditions:
   if the signal exceeds the upper threshold, then switching to the fast recirculation demagnetization mode;
   if the signal drops below the lower threshold in the fast recirculation demagnetization mode, then switching to the slow recirculation demagnetization mode until the switching cycle ends;
   if the signal exceeds the lower threshold, but is less than the upper threshold, then switching to the slow recirculation demagnetization mode;
   if the signal during the slow recirculation demagnetization mode exceeds the upper threshold, then switching to the fast recirculation demagnetization mode until the switching cycle ends; and
   if the signal is less than the lower threshold, then performing the magnetization phase.

8. A method of driving an inductive load connected to an output of a power stage, the method comprising:
   comparing a signal representative of an instantaneous value of current flowing through the inductive load with upper and lower thresholds during a switching cycle;
   alternately performing a magnetization phase during which current is forced through the inductive load, and a demagnetization phase during which a load inductance of the inductive load discharges through at least one of a slow recirculation discharge current path and a fast recirculation discharge current path; and
   switching between the slow and fast recirculation discharge current paths during each switching cycle based upon the comparing for reducing a ripple on an output signal from the power stage.

9. A method according to claim 8, wherein the switching cycle is based upon pulse width modulation.

10. A method according to claim 8, wherein the upper and lower thresholds are symmetric with respect to a reference current.

11. A method according to claim 8, wherein alternately performing the magnetization and demagnetization phases comprises, at a start of each new switching cycle, performing the magnetization phase as long as the signal remains below the upper threshold or until the switching cycle ends, whichever occurs first.

12. A method according to claim 11, wherein switching between the slow and fast recirculation discharge current paths is based upon the following conditions:
   if during the switching cycle the signal exceeds the upper threshold, then switching to the fast recirculation discharge current path as long as the signal exceeds the lower threshold or until the switching cycle ends, whichever occurs first; and
   if the signal drops below the lower threshold in the fast recirculation discharge current path, then switching to the slow recirculation discharge current path until the switching cycle ends.

13. A method according to claim 8, wherein the driving is performed at a constant switching frequency; wherein the comparing is performed at a start of each new switching cycle; and wherein switching between the slow and fast recirculation discharge current paths is based upon the following conditions:
   if the signal exceeds the upper threshold, then switching to the fast recirculation discharge current path;
   if the signal exceeds the lower threshold but not the upper threshold, then switching to the slow recirculation discharge current path; and
   if the signal is less than the lower threshold, then performing the magnetization phase.

14. A method according to claim 8, wherein the driving is performed at a constant switching frequency; wherein the comparing is performed at a start of each new switching cycle; and wherein switching between the slow and fast recirculation discharge current paths is based upon the following conditions:
   if the signal exceeds the upper threshold, then switching to the fast recirculation discharge current path;
   if the signal drops below the lower threshold in the fast recirculation discharge current path, then switching to the slow recirculation discharge current path until the switching cycle ends;
   if the signal exceeds the lower threshold, but is less than the upper threshold, then switching to the slow recirculation discharge current path;
   if the signal during the slow recirculation discharge current path exceeds the upper threshold, then switching to the fast recirculation discharge current path until the switching cycle ends; and
   if the signal is less than the lower threshold, then performing the magnetization phase.

15. A method of driving a load connected to an output of a power stage, the method comprising:
   comparing a signal representative of an instantaneous value of current flowing through the load with upper and lower thresholds during a switching cycle;
   alternately performing a magnetization phase, and a demagnetization phase comprising a slow recirculation demagnetization mode and a fast recirculation demagnetization mode; and
   switching between the slow and fast recirculation demagnetization modes during each switching cycle based upon the comparing.

16. A method according to claim 15, wherein alternately performing the magnetization and demagnetization phases comprises, at a start of each new switching cycle, performing the magnetization phase as long as the signal remains below the upper threshold or until the switching cycle ends, whichever occurs first.

17. A method according to claim 16, wherein switching between the slow and fast recirculation demagnetization modes is based upon the following conditions:
   if during the switching cycle the signal exceeds the upper threshold, then switching to the fast recirculation demagnetization mode as long as the signal exceeds the lower threshold or until the switching cycle ends, whichever occurs first; and
   if the signal drops below the lower threshold in the fast recirculation demagnetization mode, then switching to the slow recirculation demagnetization mode until the switching cycle ends.

18. A method according to claim 15, wherein the driving is performed at a constant switching frequency; wherein the comparing is performed at a start of each new switching cycle; and wherein switching between the slow and fast recirculation demagnetization modes is based upon the following conditions:
   if the signal exceeds the upper threshold, then switching to the fast recirculation demagnetization mode;

if the signal exceeds the lower threshold but not the upper threshold, then switching to the slow recirculation demagnetization mode; and if the signal is less than the lower threshold, then performing the magnetization phase.

19. A method according to claim 15, wherein the driving is performed at a constant switching frequency; wherein the comparing is performed at a start of each new switching cycle; and wherein switching between the slow and fast recirculation demagnetization modes is based upon the following conditions:

if the signal exceeds the upper threshold, then switching to the fast recirculation demagnetization mode;

if the signal drops below the lower threshold in the fast recirculation demagnetization mode, then switching to the slow recirculation demagnetization mode until the switching cycle ends;

if the signal exceeds the lower threshold, but is less than the upper threshold, then switching to the slow recirculation demagnetization mode;

if the signal during the slow recirculation demagnetization mode exceeds the upper threshold, then switching to the fast recirculation demagnetization mode until the switching cycle ends; and if the signal is less than the lower threshold, then performing the magnetization phase.

20. A system for driving a load comprising:

a full bridge final stage comprising at least four power switches controlled by respective driving signals, and being connected to the load;

a driver stage connected to said full bridge final stage for providing the respective driving signals;

a logic circuit connected to said driver stage for controlling the respective driving signals based upon respective error signals;

a sensor connected to the load for generating a signal representative of an instantaneous value of a current flowing through the load during a switching cycle; and first and second comparators having respective inputs for receiving the signal and for respectively comparing the signal to a first threshold greater than or equal to a reference value and to a second threshold less than or equal to the reference value, said first and second comparators having an output for providing the respective error signals to said logic circuit.

21. A system according to claim 20, wherein the first and second thresholds are symmetric with respect to the reference value.

22. A system according to claim 20, wherein said driver stage alternately performs a magnetization phase during which current is forced through the inductive load, and a demagnetization phase during which a load inductance of the inductive load discharges through at least one of a slow recirculation discharge current path and a fast recirculation discharge current path, and said driver stage switches between the slow and fast recirculation discharge current paths during each switching cycle based upon the comparison.

23. A system according to claim 22, wherein alternately performing the magnetization and demagnetization phases comprises, at a start of each new switching cycle, performing the magnetization phase as long as the signal remains below the upper threshold or until the switching cycle ends, whichever occurs first.

24. A system according to claim 22, wherein switching between the slow and fast recirculation discharge current paths is based upon the following conditions:

if during the switching cycle the signal exceeds the upper threshold, then switching to the fast recirculation discharge current path as long as the signal exceeds the lower threshold or until the switching cycle ends, whichever occurs first; and if the signal drops below the lower threshold in the fast recirculation discharge current path, then switching to the slow recirculation discharge current path until the switching cycle ends.

25. A system according to claim 22, wherein the switching cycle is based upon a constant switching frequency; wherein said first and second comparators compare the signal at a start of each new switching cycle; and wherein said driver stage switches between the slow and fast recirculation discharge current paths based upon the following conditions:

if the signal exceeds the upper threshold, then switching to the fast recirculation discharge current path;

if the signal exceeds the lower threshold but not the upper threshold, then switching to the slow recirculation discharge current path; and if the signal is less than the lower threshold, then performing the magnetization phase.

26. A system according to claim 22, wherein the switching cycle is based upon a constant switching frequency; wherein said first and second comparators compare the signal at a start of each new switching cycle; and wherein said driver stage switches between the slow and fast recirculation discharge current paths based upon the following conditions:

if the signal exceeds the upper threshold, then switching to the fast recirculation discharge current path;

if the signal drops below the lower threshold in the fast recirculation discharge current path, then switching to the slow recirculation discharge current path until the switching cycle ends;

if the signal exceeds the lower threshold, but is less than the upper threshold, then switching to the slow recirculation discharge current path;

if the signal during the slow recirculation discharge current path exceeds the upper threshold, then switching to the fast recirculation discharge current path until the switching cycle ends; and if the signal is less than the lower threshold, then performing the magnetization phase.

* * * * *